Sept. 15, 1931.  C. W. PLEUKHARP ET AL  1,823,062
GLASS FEEDING MACHINE
Filed June 12, 1922   3 Sheets-Sheet 1
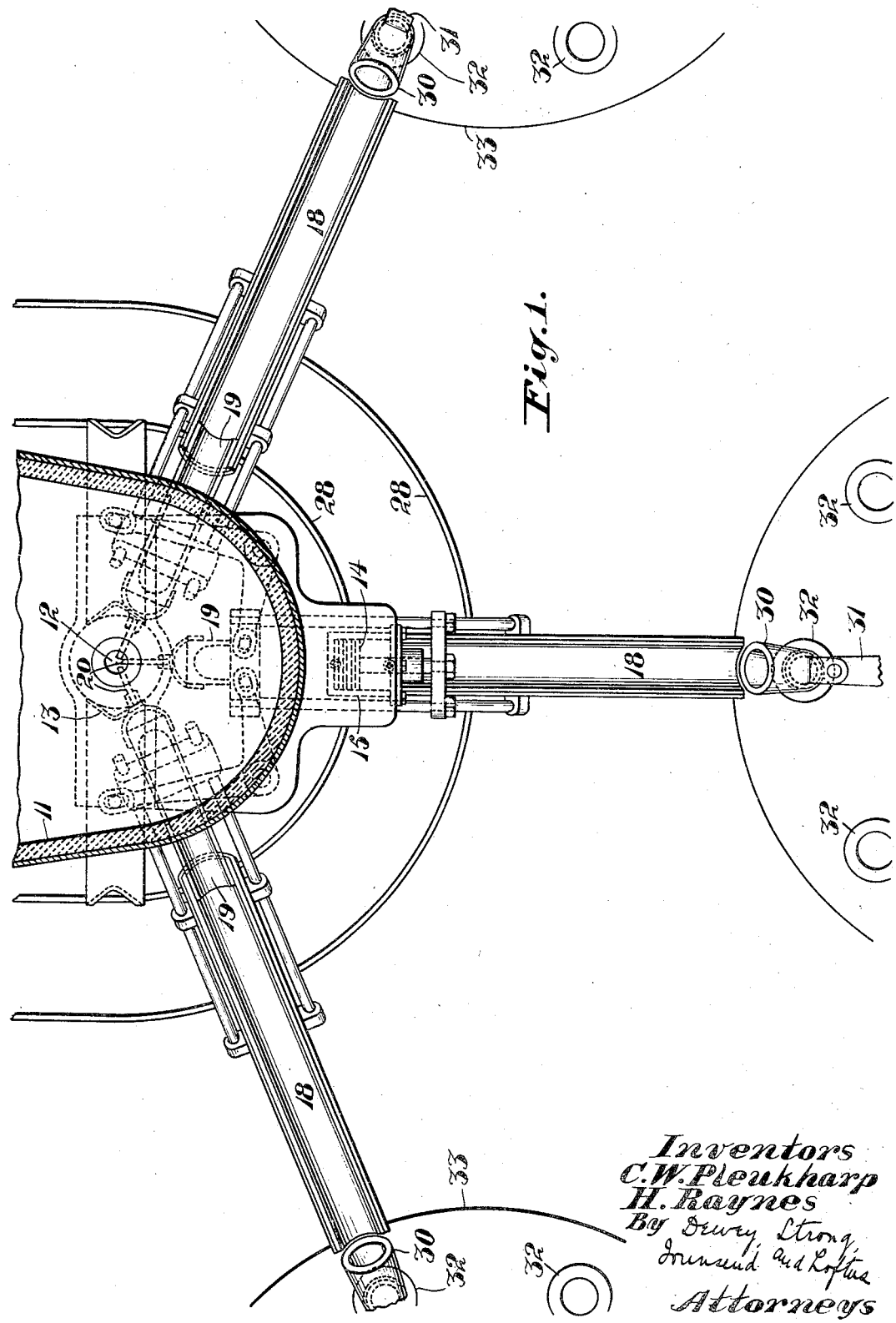

Sept. 15, 1931.  C. W. PLEUKHARP ET AL  1,823,062
GLASS FEEDING MACHINE
Filed June 12, 1922   3 Sheets-Sheet 2
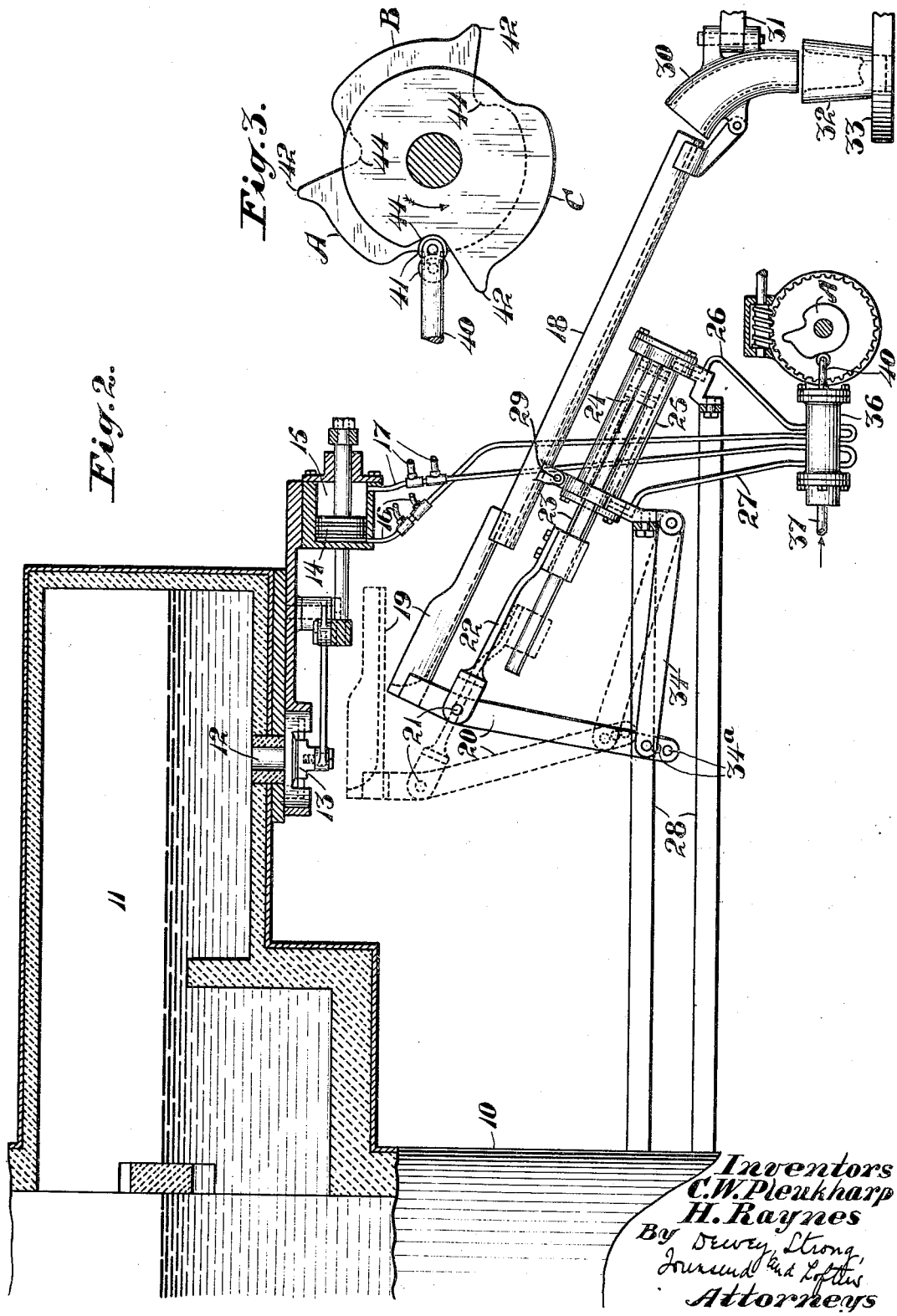

Sept. 15, 1931. C. W. PLEUKHARP ET AL 1,823,062
GLASS FEEDING MACHINE
Filed June 12, 1922 3 Sheets-Sheet 3

Inventors
C. W. Pleukharp
H. Raynes
By Dewey Strong,
Townsend and Loftin.
Attorneys

Patented Sept. 15, 1931

1,823,062

UNITED STATES PATENT OFFICE

CLAUDE W. PLEUKHARP AND HARRY RAYNES, OF SAN FRANCISCO, CALIFORNIA, ASSIGNORS, BY MESNE ASSIGNMENTS, TO HARTFORD-EMPIRE COMPANY, OF HARTFORD, CONNECTICUT, A CORPORATION OF DELAWARE

GLASS FEEDING MACHINE

Application filed June 12, 1922. Serial No. 567,633.

This invention relates to mechanism for delivering molten glass in measured quantities from a charging furnace to a series of molds.

The object of the invention is to increase the speed of delivery and to make it possible to deliver successively from a single charging furnace different quantities of glass whereby in a single machine articles of different weight may be made. With mechanisms heretofore in use, it has not been possible to deliver different quantities of glass from a single charging furnace successively to mold-carrying devices differently situated. It frequently occurs that orders for one particular article are insufficient to justify a run and it therefore is desirable to have facilities for making different sized articles in a single run.

In and by the present invention we can supply molten glass from a single charging vessel to a plurality of stations. Each station consists of a turret carrying a series of molds and the glass from the charging furnace is delivered to each station by means of a chute extending radially from the discharge orifice. Each chute has a vertically swinging part which moves into position beneath the discharge orifice long enough to receive a gather and then is retracted to allow the reciprocating part for the next chute to move into position. The machine is provided with means for regulating the size of the gather so that the chute which supplies one of the stations may receive a different weight charge than the chute which supplies another station. As means of enabling us to deliver larger or smaller charges into the inclined delivery chutes without danger of the molten glass spreading and thinning, we make use of a "monkey motion" for controlling the reciprocating part whereby the gather, when disposed beneath the discharge orifice, occupies a substantially horizontal position, and, when retracted, it gradually assumes an inclined position to permit its charge to be deposited into the inclined delivery chute without unduly spreading or thinning out.

The shape of the gather is to a large extent affected by the inclination of the chute into which it drops. A steeply inclined chute will allow the gather to spread and thin out, whereas a substantially horizontal chute will cause the gather to condense and become more compact. The shape and form which the gather assumes at the time it is deposited upon the chute is to a considerable extent retained, even though the gather subsequently moves into an inclined position. Certain kinds of pressed articles, such as thick jelly glasses and the like, are best made when the gather is condensed, while thinner walled blown articles can be made to better advantage from a gather which has spread or elongated somewhat before reaching the mold. In the present invention we provide means to vary the inclination of the chute from a substantially horizontal position to any desired inclination while the same is in position to receive a charge whereby to adapt the device to control the shape and form of the gather and to adapt the machine to the manufacture of both pressed and blown articles.

A reciprocating chute, such as is employed in the present invention, also shortens the time interval required to deliver the molten glass from the discharge orifice to the mold inasmuch as the movement of the chute is such as to aid the forces of gravity. Thereby there is less danger of chilling the glass, and, since the length of the sliding contact is also shortened, the gather will retain its original form to better advantage.

One form which our invention may assume is exemplified in the following description and illustrated in the accompanying drawings, in which—

Fig. 1 shows a plan view, partly in section, of a charging furnace fitted with delivering devices in accordance with our invention.

Fig. 2 shows a vertical, central, sectional view through the furnace and one of the delivering devices.

Fig. 3 shows a side elevation of the cam mechanism for controlling the delivery devices and shears.

Figure 4:
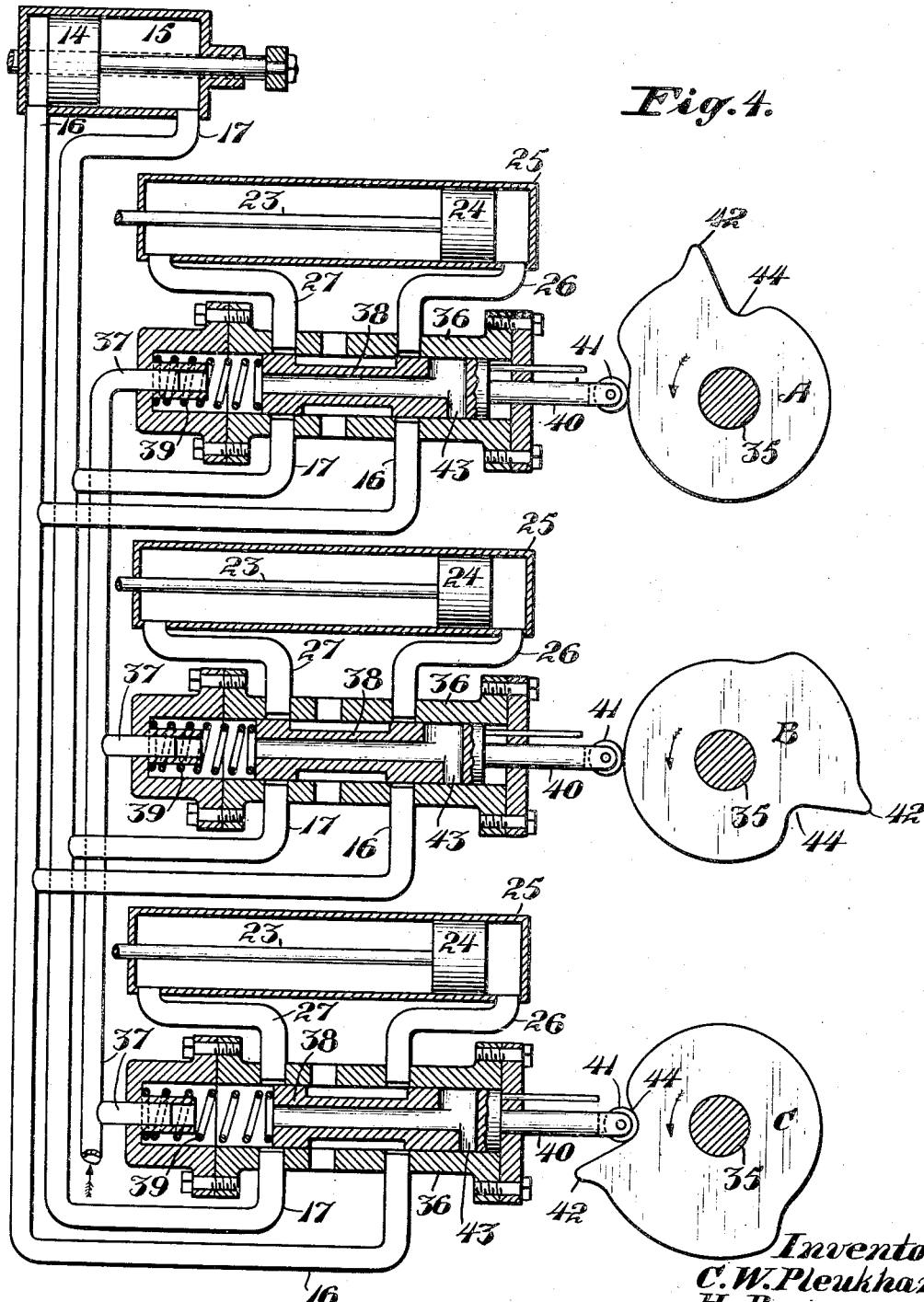
Fig. 4 shows a diagram, partly in section, of the cam mechanism and valves for controlling the operation of the delivery devices and shears.

Referring in detail to the accompanying drawings, we show a vessel 10 provided with a boot 11, the latter having a discharge orifice 12. Beneath the discharge orifice is a severing device 13 actuated by a piston 14 working in a cylinder 15. The cylinder is provided with compressed air pipes 16 and 17 for actuating the piston.

Extending radially from the boot and terminating short of the discharge orifice are a plurality of inclined chutes 13, three being shown in the present instance. Cooperating with the upper end of each chute is a reciprocating part 19. Each part 19 has a radial movement allowing it to move back and forth between the discharge orifice and the related delivery chute. During the radial movement the swinging chute changes from a substantially horizontal position to an inclined position, somewhat after the fashion of a disappearing gun. We have, therefore, termed this movement a "monkey motion".

The swinging chute is fixed upon an arm 20. This arm is pivoted at 21 to a rod 22. The rod is rigidly connected to a stem 23 of a piston 24, the latter working in a cylinder 25. The cylinder is provided with compressed air pipes 26 and 27 for actuating the piston. The cylinder is arranged beneath the related delivery chute and is preferably carried upon frame bars 28. The chute in turn is pivoted at its upper end, as shown at 29, to the cylinder, so that if desired its angle may be changed for different conditions of work. The discharge end of the chute connects with a funnel 30 fastened to a frame 31 and the funnel empties into molds 32 carried by a turret 33.

In order to swing the swinging chute from an inclined to a horizontal position, we pivot the lower end of the arm 20 to a link 34, which, in turn, is pivoted to one of the frame bars 28. The path of movement of the chute is indicated in dotted lines in Fig. 2. By means of spaced openings 34ª the point of connection between the arm 20 and link 34 may be changed for the purpose of varying the working angle of the chute.

There being a plurality of these chutes and actuating devices, it is necessary to time their action so that they operate in succession. This is done by cam mechanism indicated in diagram in Fig. 4. There are three cams indicated respectively at A, B and C, on a single shaft 35. Each cam actuates a valve mechanism, there being one such valve mechanism for each delivery device. The valve mechanism comprises a casing 36 in communication at one end with an air supply pipe 37. Within the casing is a piston valve 38, which is normally held projected by a spring 39. The air supply pipes 26 and 27 connect with the casing at the opposite ends of the latter, and when the piston valve is projected by its spring, the air pipe 27, which opens into the upper end of the cylinder 25 and serves to retract the swinging chute, is open to communication with the air supply pipe 37. To cut off the pipe line which retracts the chute and open the other line 26, the piston valve is fitted with a stem 40 having a roller 41 to co-act with one of the cams A, B or C. The cams are set relatively so that the swinging chutes are actuated successively and these cams may be of varying size, so that one chute may be held projected for longer periods than the others whereby to vary the size of the charge delivered. As shown herein, the cam A has a relatively short raised portion, whereas cam C has a relatively long one. In consequence, the chute which is actuated by cam A will remain beneath the discharge orifice a shorter time than will the chute which is actuated by cam C.

In this connection the actuation of the shears or severing device must be timed according to the movement of the reciprocating chutes, and therefore we connect the cylinder 15 with each of the controlling valves by means of the pipe lines 16 and 17. The position of the piston 14, as shown in Fig. 2, represents an open position of the shears and this advanced position of the piston is obtained when the controlling valves are held projected by the springs 39. Each of the cams A, B and C has a finger 42 at the end of its raised portion, which contacts with the roller 41 and depresses the piston valve sufficiently to bring a port 43 therein into communication with the pipe line 16 for closing the shears. Immediately following the position of the finger 42 on each cam is a depression 44 which allows the piston valve to move outwardly far enough to establish communication with the pipe line 17 whereby to open the shears. At other times in the movement of the cam the pipe lines 16 and 17 are cut off from the air supply pipe 37, as indicated in Fig. 4. It results, therefore, that immediately preceding the retraction of a chute, the shears will be actuated to cut off a charge of glass, and, after the chute has moved away, another chute takes its place, remaining beneath the discharge orifice until after the shears are again actuated. The time interval between actuations of the shears is controlled by relative positions of the fingers 42, and the period of time during which the chutes remain beneath the discharge orifice is determined by the length of the raised portions of the cams, which likewise may be varied.

The present device is to be distinguished from prior devices or methods wherein one device delivers successively to different molds and in which the movement of the device is crosswise of the orifice rather than radial thereto. In such prior devices, the charge has a tendency to jump out of the trough and hence gives rise to one factor which limits the speed of operation. The speed of operation is also limited by the transverse movement as against our reciprocating movement.

In the present invention, by dispensing with swinging chutes or a single stationary chute and using the reciprocating extensions for each of the series of chutes or troughs, we increase the initial velocity and acceleration during the delivery of the gather of molten glass to the turret or mold-carrying devices with minimum distortion to the gather and with a minmium interval of time required for the gravity forces to complete their functions, thereby causing less chilling of the molten glass on the side that is in contact with the cool sliding surface of the delivery chutes.

Having thus described our invention, what we claim and desire to secure by Letters Patent is:—

1. In a glass feeding machine, the combination with a charging vessel having a discharge orifice for molten glass, a plurality of delivering devices for delivering measured quantities of molten glass to different stations and comprising each a swinging chute, and means to control said swinging chutes to vary the time of movement of one with relation to the other 2. In a glass feeding machine, the combination with a charging vessel having a discharge orifice, a severing device co-operating with the discharge orifice, a plurality of delivery devices for delivering measured quantities of molten glass to different stations and comprising each a swinging chute, means to control the chutes whereby to vary the time of movement of one with relation to the other, and means to coordinate the movement of the severing device with the movement of the chutes.

3. In a glass feeding machine, the combination with a vessel having a discharge orifice for molten glass, a movable member carrying a series of molds, a stationary inclined delivery chute communicating with said molds and a swinging chute movable from a substantially horizontal position beneath the discharge orifice to an inclined position adjacent the stationary chute.

4. In a glass feeding machine, the combination with a vessel having a discharge orifice for molten glass, a movable member carrying a series of molds, a stationary inclined delivery chute communicating with said molds, a swinging chute movable from a substantially horizontal position beneath the discharge orifice to an inclined position adjacent the stationary chute, means for varying the inclination of the stationary chute and means for varying the working angle of the swinging chute.

5. In a glass feeding machine, the combination with a charging furnace having a delivery opening, a plurality of mold charging stations grouped around said delivery opening, individual chutes for each of said charging stations, and fixed relative thereto, swinging chutes for each of the charging stations, and means for operating said chutes whereby each of the chutes will successively assume a horizontal position beneath the charging opening and will thereafter move forwardly with a charge to a position in longitudinal alignment with its respective fixed chute and deliver the charge thereonto.

6. In a glass feeding machine, the combination with a charging furnace having a delivery opening, a plurality of mold charging stations grouped around said delivery opening, individual chutes for each of said charging stations and fixed relative thereto, swinging chutes for each of the charging stations, and means for operating said chutes whereby each of the chutes will successively assume a horizontal position beneath the charging opening and will thereafter move forwardly with a charge to a position in longitudinal alignment with its respective fixed chute and deliver the charge thereonto, and means for severing the charge drawn from the furnace, said means including individual actuating devices for variably controlling the amount of molten glass delivered to the swinging chute members of the various charging stations.

7. Apparatus for separating molten glass into mold charges of different weights comprising a container, having a discharge outlet, severing mechanism below the outlet and means for operating the severing mechanism at the end of intervals of different duration in a given cycle.

8. The method of producing mold charges of different sizes for making glassware, which comprises discharging molten glass from a container, and severing the discharged glass at regulated unequal intervals of time, adapted to the different sizes to be produced.

9. The method of producing mold charges of different sizes for making glassware, which comprises discharging molten glass from a container, and severing the discharged glass at time intervals of periodically varying duration.

10. The method of producing mold charges of different sizes for making glassware, which comprises discharging molten glass from a container, and severing the discharged glass in repeated series of intervals varying in a cyclic order in each of the series.

CLAUDE W. PLEUKHARP.
HARRY RAYNES.